No. 738,144. PATENTED SEPT. 8, 1903.
T. AGNEW & F. DENMAN.
HORSESHOE.
APPLICATION FILED MAY 19, 1903.
NO MODEL.
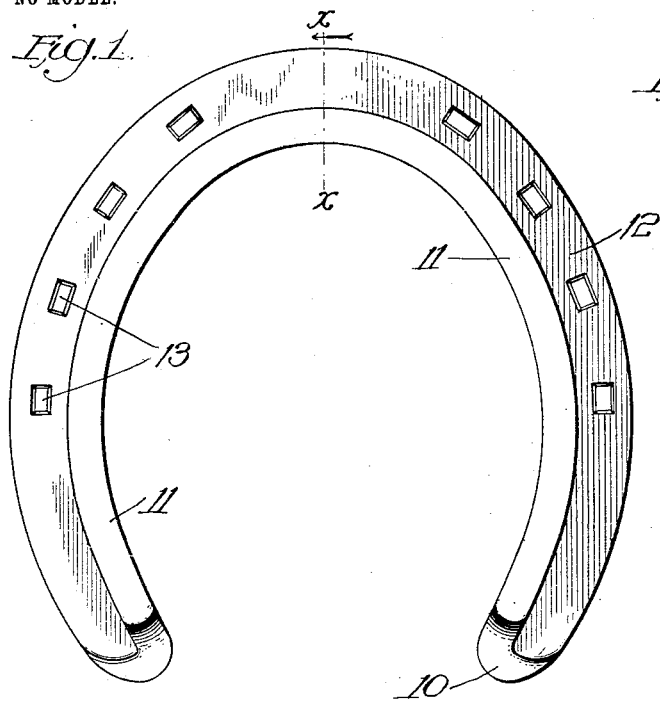
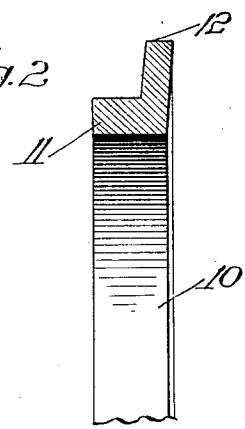
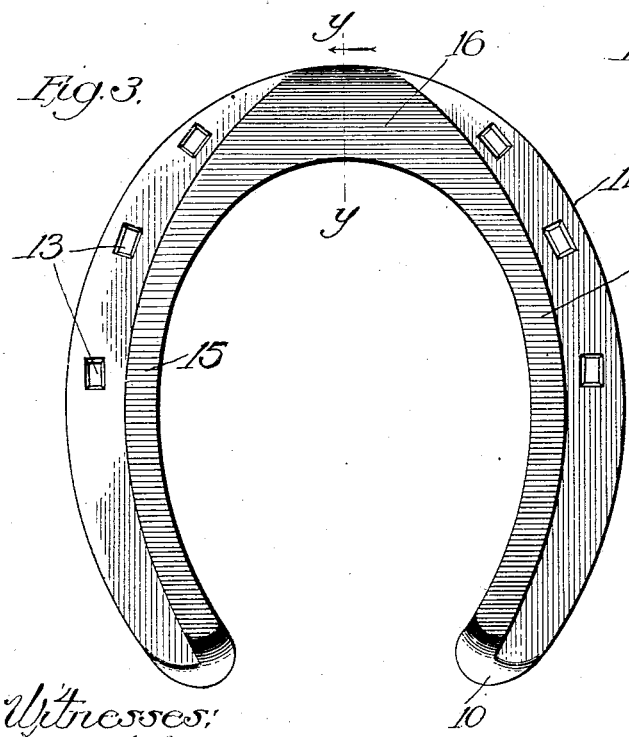
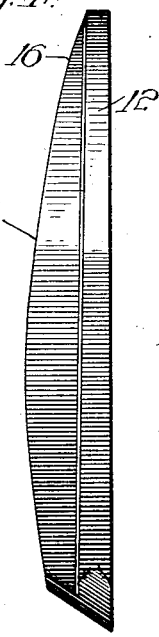
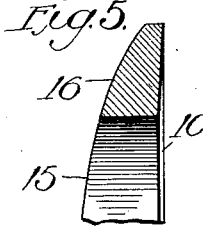
Witnesses:
Harold G. Barrett
E. M. Hatcher
Inventors.
Thomas Agnew and
Frederick Denman,
By Louis K. Gillson Atty.

No. 738,144. Patented September 8, 1903.

UNITED STATES PATENT OFFICE.

THOMAS AGNEW AND FREDERICK DENMAN, OF CHICAGO, ILLINOIS.

HORSESHOE.

SPECIFICATION forming part of Letters Patent No. 738,144, dated September 8, 1903.

Application filed May 19, 1903. Serial No. 157,802. (No model.)

*To all whom it may concern:*

Be it known that we, THOMAS AGNEW and FREDERICK DENMAN, citizens of the United States, and residents of Chicago, county of Cook, and State of Illinois, have invented certain new and useful Improvements in Horseshoes, of which the following is a specification, and which are illustrated in the accompanying drawings, forming a part thereof.

This invention relates to improvements in horseshoes, and has for its object to provide a shoe with which the bearing is spread over substantially the entire hoof, but yet within the edge thereof, thereby reducing the area of contact with the ground and providing a shoe which will permit of the foot turning easily and not interfering with the free movement of the ankle and limb of the animal.

The invention has for a further object to provide a shoe capable of a rocking or rolling motion, so as to adapt itself to the natural movement of the animal's foot and relieve the ankle of the strain incident to the employment of the ordinary flat-tread shoe.

The invention is fully set forth in the accompanying description, specifically designated in the appended claims, and is illustrated in the accompanying drawings, in which—

Figure 1 is a bottom view of the horseshoe constructed in accordance with our invention. Fig. 2 is a section on the line $x\ x$ of Fig. 1; Fig. 3 illustrates a modified form of the invention. Fig. 4 is a side edge view of the construction shown in Fig. 3. Fig. 5 is a section on the line $y\ y$ of Fig. 3, and Fig. 6 is a section of a further modification.

Referring to Figs. 1 and 2, the body or plate 10 of the shoe, which may be made of any desired width and weight depending on the use to which it is to be put, is provided with a vertical rib 11. This rib or calk extends from heel to heel of the shoe and is located at the inner edge of the plate 10. The plate or body outside of the calk 11 extends as a rim or ledge 12 and is provided with the usual apertures 13, through which the nails are passed for securing the shoe to the horn or crust of the hoof. The upper face of the shoe may be of uniform width and is depressed inwardly, as shown in the sectional views 2, 5, and 6, to provide a suitable foundation for the horn of the hoof.

By the construction described—that is to say, by locating the continuous calk 11 at the inner edge of the shoe—the weight of the animal is taken from the edge of the hoof, and, furthermore, the area of surface-contact is reduced and the animal is enabled to lift its foot more readily from the ground and with an easier and more natural motion.

The calk shown in Fig. 1 is particularly designed for ordinary work, the bearing-face of the same being flat. A modification of this is shown in Fig. 6, the calk in this instance being brought to an edge, as shown at 14, in order to provide a shoe for winter work and at other times when the ground is in a slippery condition.

The shoe illustrated in the modification, Figs. 3, 4, and 5, is particularly adapted for speed work, although it may be used with draft-animals, and has been found to be very efficient in the treatment of lame horses. In this form of shoe the calk 15 also extends from heel to heel and may, as shown, be located at the inner edge of the body of the shoe, as in the other forms described. This shoe is, in effect, of rocker form, the calk 15 rising from the heel ends of the shoe and describing a gradual curve to a point between the ends, whence it sinks in a gradual curve into the toe. In other words, the curvature is continuous longitudinally from the heel portions of the shoe to the toe portion. The forward ends of the two sides of the calk may be made of gradually-increasing width from near and toward the front of the shoe, thereby enabling the calk to more gradually sink, as at 16, into the toe of the shoe. In the use of this latter form the foot strikes substantially midway between the ends of the shoe and the toe sinks down as the foot turns, thereby permitting of the natural rolling or rocking movement of the foot.

We claim as our invention—

1. A horseshoe comprising a plate curved to conform to the outline of the hoof and provided with a continuous calk curving upwardly to the toe from a point between the ends of the shoe.

2. A horseshoe comprising a plate curved to conform to the outline of the hoof and provided with a continuous calk extending from heel to heel of the shoe and describing a downwardly-bowing curve from the heel of each limb to the toe.

3. A horseshoe comprising a plate curved to conform to the outline of the hoof and provided at its inner edge with a continuous calk extending from heel to heel of the shoe, the calk gradually increasing in depth from the heel of each limb of the shoe to a point between the ends of the shoe and then curving gradually upward and expanding in width to the toe.

THOMAS AGNEW.
FREDERICK DENMAN.

Witnesses:
 GEO. E. WALDO,
 E. M. KLATCHER.